United States Patent [19]

Eddy et al.

[11] 3,809,822

[45] May 7, 1974

[54] COMMUNICATION SWITCHING SYSTEM INTERLOCK ARRANGEMENT

[75] Inventors: John W. Eddy, Villa Park; Sergio E. Puccini, Wood Dale, both of Ill.

[73] Assignee: GTE Automatic Electric Laboratories Incorporated, Northlake, Ill.

[22] Filed: Nov. 2, 1972

[21] Appl. No.: 303,157

[52] U.S. Cl. .......... 179/18 E

[51] Int. Cl. .......... H04m 3/00

[58] Field of Search .......... 179/18 E, 18 EB, 18 ES, 179/18 AH

[56] References Cited

UNITED STATES PATENTS

| | | | |
|---|---|---|---|
| 3,566,040 | 2/1971 | Lucas | 179/18 ES |
| 3,487,173 | 12/1969 | Duthie | 179/18 ES |

*Primary Examiner*—Kathleen H. Claffy
*Assistant Examiner*—David L. Stewart
*Attorney, Agent, or Firm*—B. E. Franz

[57] ABSTRACT

An interlock arrangement for a communication switching system having a switching network controlled by a marker for establishing a path through the switching network between a first supervisory unit, such as a register junctor, and a second supervisory unit, such as a terminating junctor or trunk circuit, includes a switching circuit in the marker for applying a first holding signal to a holding control lead of the path for causing the path to be maintained between the two supervisory units, a switching circuit in the first supervisory unit responsive to the first holding signal to apply a second holding signal to the holding control lead for maintaining the path established, a circuit in the marker for removing subsequently the first holding signal from the holding control lead, and a testing circuit in the marker responsive to the removal of the first holding signal and to the presence of the second holding signal for causing the marker to release, whereby the first supervisory unit maintains the path established to enable the marker to release for servicing other connections through the network.

16 Claims, 11 Drawing Figures

NOTE: BIT 24 (MEMORY PROTECT) AND
BIT 25 (PARITY) ARE NOT SHOWN.

PATENTED MAY 7 1974 3,809,822

SHEET 08 OF 10

COMMUNICATION SWITCHING SYSTEM INTERLOCK ARRANGEMENT

BACKGROUND OF THE INVENTION

1. Field of the Invention

The present invention relates to an interlock arrangement for a communication switching system, and it more particularly relates to an arrangement for transferring the control of a path established through a switching network from the switching system marker to a supervisory unit.

Communication switching systems, such as common control telephone systems, have employed switching matrices in the communication paths between calling and called lines with markers for establishing the paths between supervisory units, such as junctors. For example, in telephone switching systems, marker-controlled switching matrices connect a communication path between a calling line to a register junctor of a register-sender common control apparatus during an originating portion of a call, and a terminating-marker controlled switching matrix establishes a path through a matrix between the register junctor and a second supervisory unit, such as a terminating junctor for a local line or a trunk circuit for an outgoing trunk call, for completing the path to a called local line or a trunk. While such an arrangement has been successfully employed, it would be highly desirable to enable the terminating marker utilized in esablishing the terminating portion of the call to release after it establishes the path between the register junctor and the second supervisory unit so that the terminating marker may then be used to service other calls. In this regard, for example, when the call is an outgoing trunk call, the terminating marker must otherwise wait during the time-consuming outpulsing operation. Therefore, it would be highly desirable to have an interlock arrangement which enables the terminating marker to release its control of the path and transfer the control to the register junctor while insuring that the register junctor has taken control of the path before the terminating marker releases.

SUMMARY OF THE INVENTION

Therefore, the principal object of the present invention is to provide a new and improved communication switching system interlock arrangement, which enables the control of a path through a switching network between first and second supervisory units to be transferred from the marker to the first supervisory unit, while insuring that the control is transferred to the first unit before the marker releases.

Briefly, according to the invention, there is provided a communication switching system interlock arrangement, which includes a switching circuit in the marker for applying a first holding signal to a holding control lead of the path established through the switching network for causing the path to be maintained between the first supervisory unit and the second supervisory unit, a circuit in the first supervisory unit responsive to the first holding signal to apply a second holding signal to the holding control lead for maintaining the path established, a circuit in the marker for removing subsequently the first holding signal from the holding control lead, and a testing circuit in the marker which responds to the removal of the first holding signal and to the presence of the second holding signal for causing the marker to release, whereby the first supervisory unit maintains the path established and enables the marker to release for servicing other connections through the switching network.

CROSS-REFERENCES TO RELATED APPLICATIONS

A system adapted to incorporate the principles of the present invention is disclosed in U.S. Pat. application Ser. No. 130,133, filed Apr. 1, 1971 by K. E. Preshcher, R. E. Schauer and F. B. Sikorski for a PROCESSOR CONTROLLED COMMUNICATION SWITCHING SYSTEM, now abandoned, hereinafter referred to as the SYSTEM patent application, and in U.S. Pat. application Ser. No. 201,851 filed Nov. 24, 1971 by S. E. Puccini for a DATA PROCESSOR WITH CYCLIC SEQUENTIAL ACCESS TO MULTIPLEXED LOGIC AND MEMORY now U.S. Pat. No. 3,737,873, issued June 5, 1973. The delay circuit of the terminating junctor or trunk circuit as disclosed in block diagram form herein is disclosed in detail in U.S. Pat. application Ser. No. 139,336, filed May 3, 1971 by J. P. Mills for a RELAY RELEASE DELAY CIRCUIT, now U.S. Pat. No. 3,732,467, issued May 8, 1973, hereinafter referred to as the DELAY CIRCUIT patent application.

DESCRIPTION OF THE DRAWINGS

These and further objects of the present invention will be understood more fully and completely from the following detailed description when considered with reference to the accompanying drawings, wherein.

Figure 10:
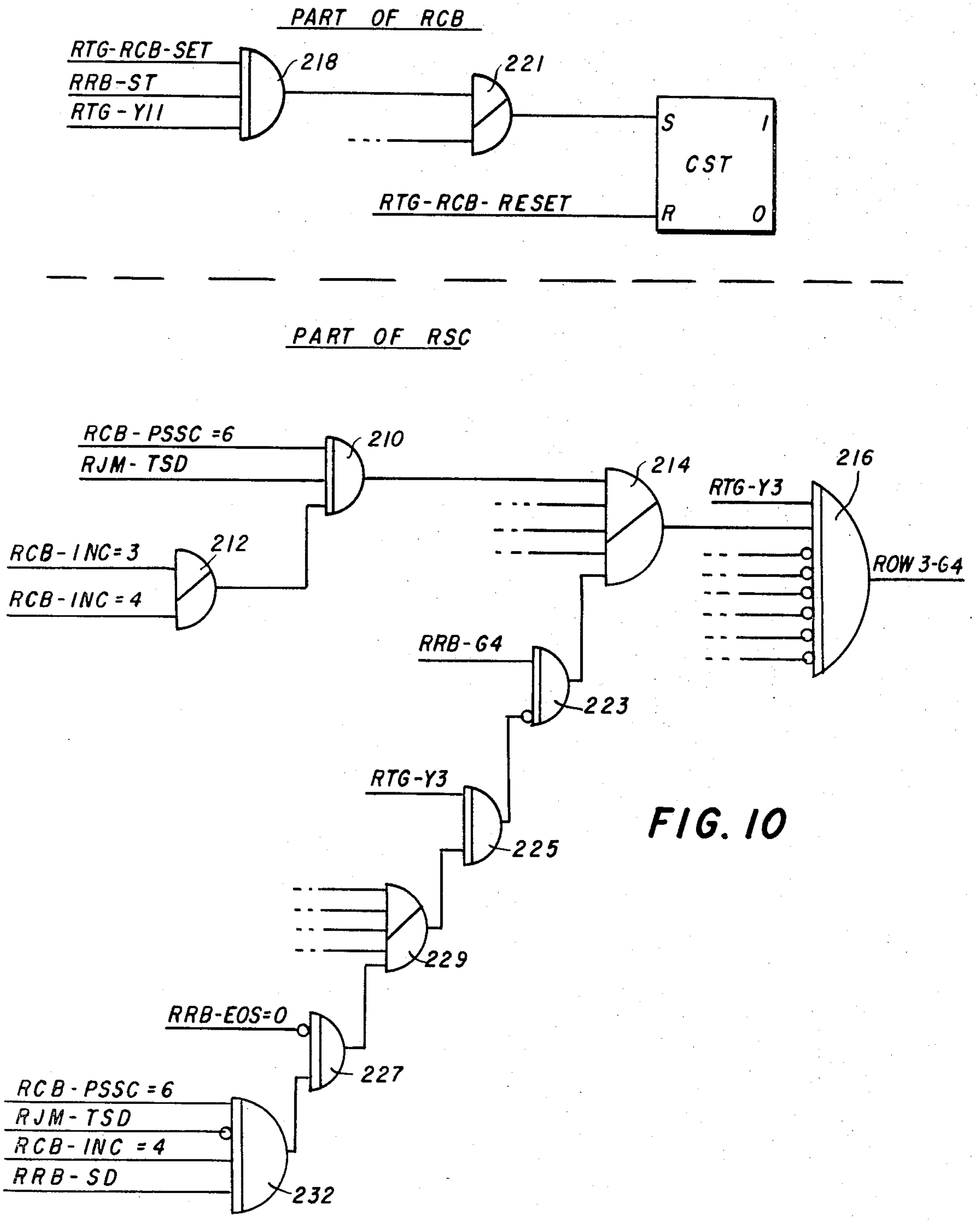
Figure 11:
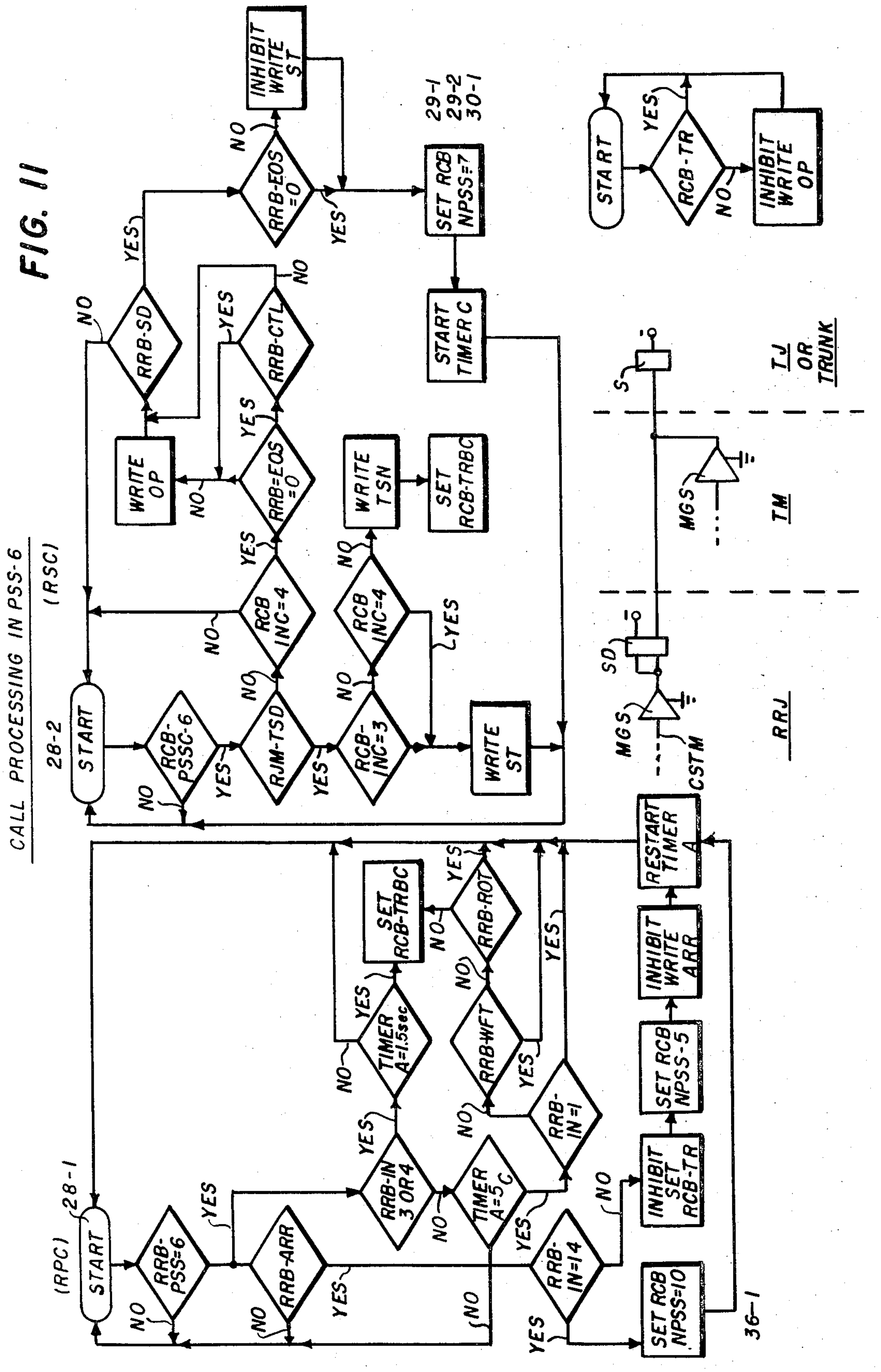

FIG . 9 is a chart showing the organization of the information for each register junctor stored in the register-sender memory;

FIG. 10 is a functional block diagram of a portion of the logic circuits of the common control logic; and FIG. 11 is a flow chart of a portion of the interlock operation.

DESCRIPTION OF THE PREFERRED EMBODIMENT

Figure 1:
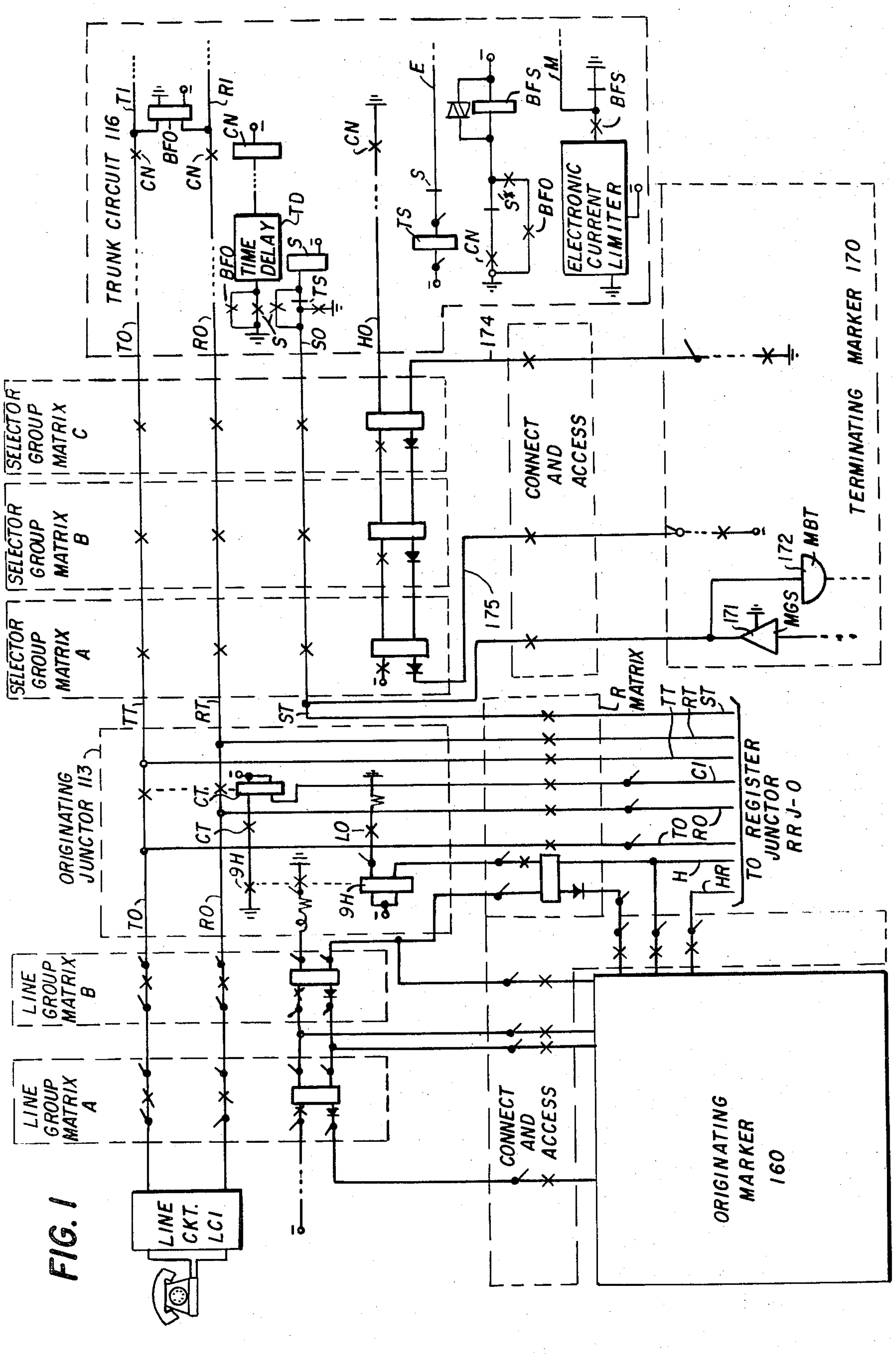
FIG. 1 is a simplified schematic and functional block diagram of a portion of a system incorporating the interlock arrangement of the present invention.
Figure 2:
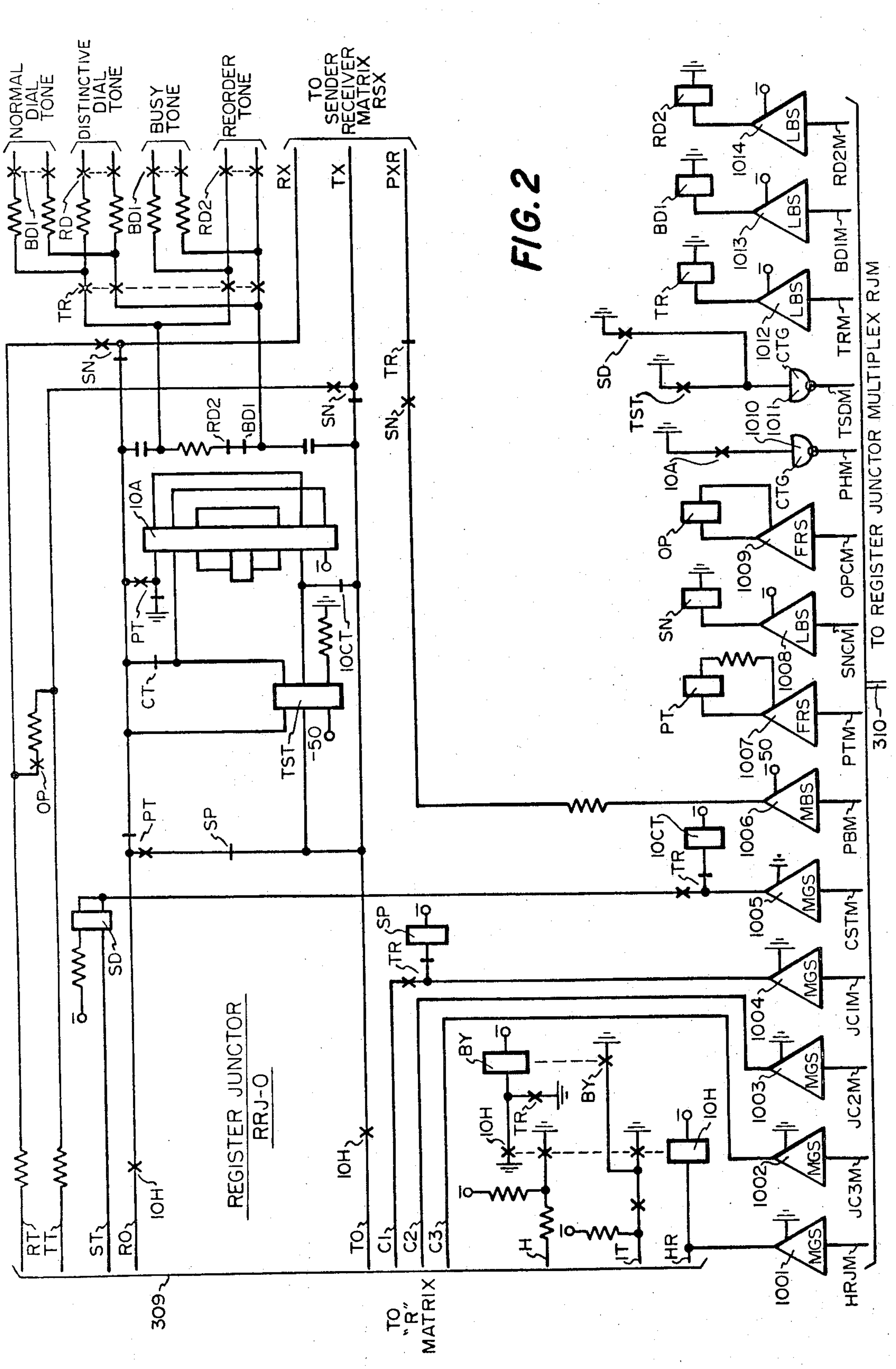
FIG. 2 is a functional block diagram of the register junctor portion of the interlock arrangement of FIG. 1.

Referring now to the drawings, and more particularly to FIGS. 1 and 2 thereof, there is shown a portion of a system which incorporates an interlock arrangement constructed in accordance with the present invention. The interlock arrangement of the present invention in the preferred form thereof enables a terminating marker 170 (FIG. 1) to establish a path including the transmission leads TT and RT and a control lead ST from the register junctor, such as the register junctor RRJ-O, through a three-stage selector group switching network comprising selector group matrix A, selector group matrix B and selector group matrix C, to a trunk circuit 116, and thereafter enable the register junctor RRJ-O to maintain the establishment of the path therefrom to the trunk circuit 116 so that the terminating marker 170 can release to service other connections. The interlock arrangement generally includes a relay SD of the register junctor (FIG. 2) having a balanced pair of series-connected windings, one of which is connected directly to the control lead ST and the other one of which being connected through a current-limiting resistance to a negative battery potential. After the terminating marker 170 establishes the path through the selector group switching network, a main ground switch 171 of the terminating marker 170 applies a signal by connecting a ground potential through the connect and access circuit for the terminating marker 170 to the control lead ST for operating the relay SD with both of its windings in series, and the same ground signal from the main ground switch 171 is extended through the selector group switching network to operate a relay S in the trunk circuit 116 to cause the path through the selector group switching network to be maintained established as hereinafter described in greater detail. As a result, the relay SD closes its contacts to energize a gate circuit 1011 of FIG. 2 to generate a signal for common control logic (not shown) via the register junctor multiplex circuit RJM so that the common control logic can determine that the path has been established and the terminating marker 170 has assumed control thereof. The common control logic thereafter connects ground via a main ground switch 1005 through a normally open contact of the relay TR, which is operated during the terminating portion of the call, to a point common to both of the windings of the relay SD, which remains operated.

After a predetermined time interval, the terminating marker 170 removes the ground from the lead ST, and relay S of the trunk circuit 116 remains operated via the ground applied by the main ground switch 1005 through the lower winding of the relay SD to the lead ST and through the selector group switching network. The relay SD restores since the direction of current flow through its lower winding is reversed to cause the magnetic fields produced by the windings to be in opposition. A main battery test gate 172 of the terminating marker 170 has its input connected in common with the output of the main ground switch 171 and thus is connected through the terminating marker connect and access circuit to the lead ST, whereby after the ground applied by the terminating marker 170 via its main ground switch 171 is removed from the lead ST, the main battery test gate 172 detects an intermediate voltage signal present on the lead ST to indicate to the terminating marker 170 that the path is complete between the register junctor and the selector group switching network and also between the selector group matrix and the trunk circuit 116.

The control lead ST may be utilized by the register junctor to signal the trunk circuit 116 after the terminating marker 170 has released. In this regard, a relay CN of the trunk circuit 116 is operated via a time delay circuit TD which has its output connected to the relay coil CN and has its input energized by a pair of normally open contacts of the relay S, whereby when the relay S operates, the relay CN operates. However, when relay S is released during signaling operations, relay CN will remain operated as determined by the time delay of TD. As a result, when the register junctor RRJ-O desires to signal the trunk circuit 116 via the control lead ST, the main ground switch 1005 of the register junctor (FIG 2) interrupts the ground potential connected to the lead ST via the lower winding of the relay SD and the transfer contacts of the relay TR at periodic intervals for signalling purposes. It should be noted that the frequency of the interruptions is less than the predetermined time delay interval of the time delay circuit TD so that the relay CN maintains the transmission path to the battery feed relay BFO, while the relay S operates and then restores.

It should be understood that while a trunk circuit is shown and described, another type of supervisory circuit, such as a terminating junctor for a locally terminating call, may also be employed in accordance with the present invention.

General System Description

Figure 3:
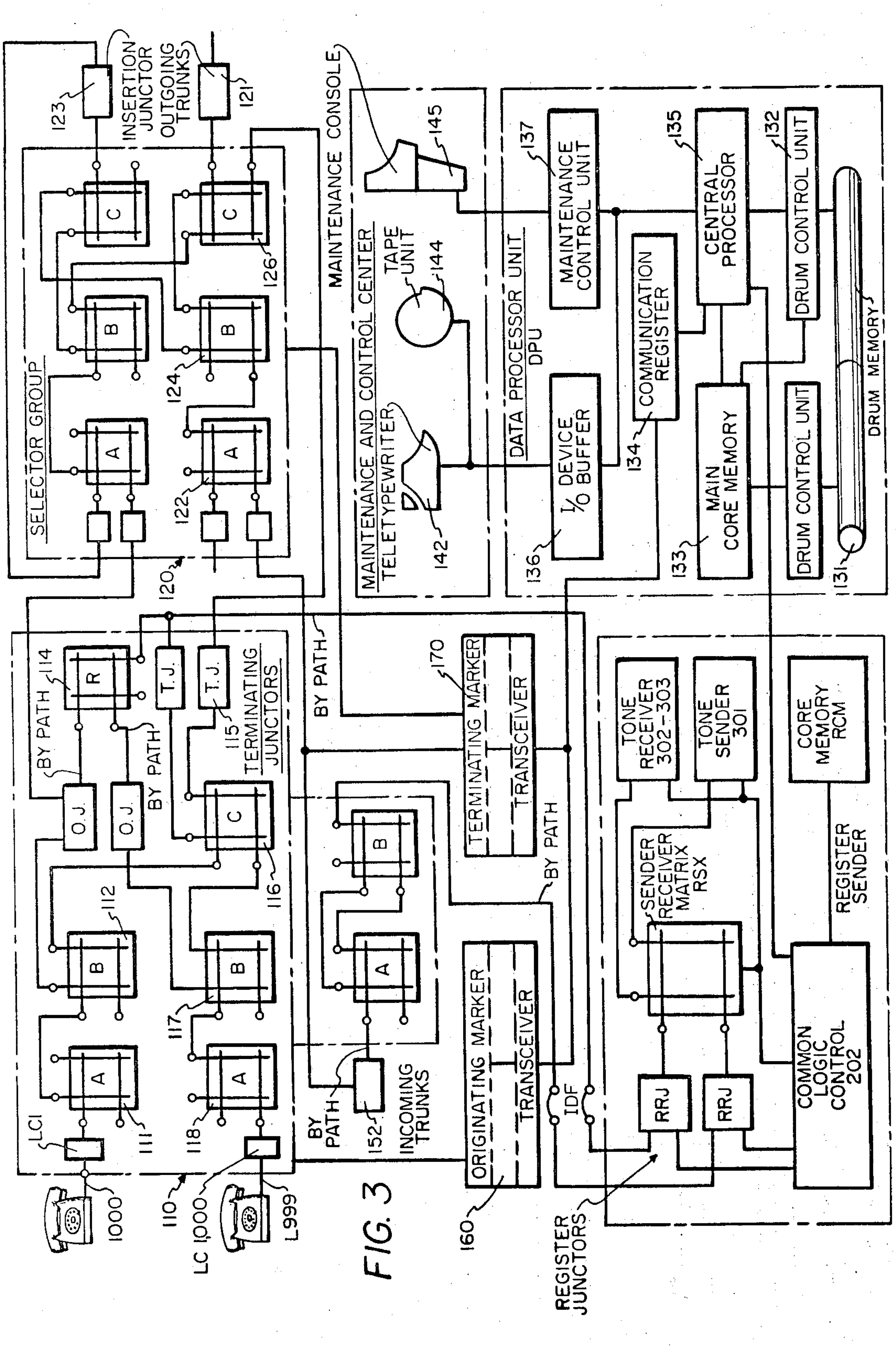
FIG. 3 is a block diagram of a communication switching system incorporating the preferred embodiment of the present invention.

The telephone switching system is shown in FIG. 3. The system is disclosed in the foregoing-mentioned system patent applications. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 from the switching network for this system and provide full-metallic paths through the office for singaling and transmission.

The originating marker 160 provides high-speed control of the switching network to connect calls entering the system to the register-sender 200. The terminating markers 160 control the switching networks of the selector group 120 for establishing connections therethrough; and if a call is to be terminated at a local customer's line in the office then the terminating marker sets up a connection through both the selector group 120 and the line group 120 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

Typical Calls

The following parts present a simplified explanation of how two basic call types are processed by the system. The following call types are covered in the order listed: (1) call from a local party served by one switching unit to another local party served by the same switching unit, and (2) call from a local party served by a switching unit destined for a party served by a distant office, via an outgoing trunk.

In the following presentations, reed relays are usually referred to as correeds. Not all of the data processing operations which take place are included.

Local Line-to-Local Line Call

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

Following the register junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key (touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g., ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function.

The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that register) in the data processor core memory is returned to idle.

Local Line-to-Outgoing Trunk Call

The processing of a call originated by a local customer, but destined for a distant office, is handled the same as previously described for a "local-to-local" call up to the point where a three-digit translation has occurred. The digits are analyzed and it is determined that the call destination is not a local line. Operation from this point forward is described in subsequent paragraphs.

For this example, the call is originating from a rotary dial line. The customer is making a seven-digit EAS (extended area service) call requiring tandem switching through the connecting office. The connecting office is equipped for wink-start pulsing. The trunk to the connecting office is an E and M trunk requiring D.C. pulsing.

the routing information and the class of the calling party allows the data processing to determine all register-sender instructions necessary to forward this call toward its destination.

The data processor writes the sending requirements into the register-sender core memory fields. These include the following information and instructions for this example: (a) early outpulsing of all digits received, (EOP field is set), (b) when seven digits are received, dialing is finished (TL field is set equal to 7), (c) close terminating loop in the register junctor, and (d) working with the terminating marker. There are also other instructions relating to start signals, send mode, etc.

The network switching instruction is sent to the terminating marker via the communication register. The marker then makes various tests, selects a selector outlet, and completes a path thereto. When the marker recognizes that the path has been connected properly, it clears from the matrix and sends a message to the data processor indicating successful call completion and the identity of the trunk that was used.

The data processor will place this information in the call history table and write into register-sender core memory that outpulsing may proceed when start signals have been received. When the distant office is prepared to receive digits, it will return an off-hook signal of approximately 150 milliseconds, which the outgoing trunk converts to a ground on the S lead. This causes the stop dial (SD) relay in the register junctor to operate. At the end of the 150-millisecond period, the SD relay restores and outpulsing begins.

The register-sender will outpulse the digits accumulated at this point (early outpulsing) and will outpulse each additional digit as it is received from the customer (no digits are deleted or prefixed in this example). When seven digits have been accumulated and sent, the register-sender will signal the originating junctor to switch through.

The register junctor will release itself from the call, releasing the R matrix. The register-sender memory is cleared, and the call history table in the data processor is reset. The calling party now controls the outgoing trunk. When the called party served by the connecting office answers, they may begin to converse. The calling line is now connected to the connecting office via the line matrix, originating junctor, selector matrix, and outgoing trunk.

When the calling party disconnects, the outgoing trunk releases the selector matrix, releasing the originating junctor and line matrix. Release of the line cut-off correed idles the customer's line for future calls.

The outgoing trunk remains busy for a short time to insure release of the connecting office. It then returns to idle.

Symbolism for Gates and Bistable Devices

Relay units such as the register junctors include interface circuits for signals to and from the electronic frames. These interface circuits are relay drivers and test gates as shown for example at the bottom of FIG. 2. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in saturation to a relay; those designated FRS are fast-release relay switches comprising two transistors such that when a true signal is applied to the input the two output leads from the collectors of two transistors connected to the two sides of the relay winding supply a low impedance path to operate the relay; and those designated LBS for low current battery switch comprise a single transistor which when a true signal is applied at the input supply a low impedance path including the collector-emitter path to operate the relay. The contact test gate designated by CTG is a circuit which when ground is supplied via relay contacts at its input supplies a true signal at its output.

Register Junctor

Referring now to FIG. 2, the register junctor's function is the interface between the subscriber lines and incoming trunks, and the time-shared circuits of the register-sender. The register junctors are used for digit receiving or sending, tone application, a battery feed device to the calling station, party and coin testing, busy and idle indication to the originating marker, and as a source of hold for the matrix path.

There are two types of register junctors; the local register junctors used with the R stage outlet to subscriber lines and paystations, and incoming register junctors used with incoming trunks and having less complexities than the local register junctors.

The register junctor RRJ-O shown in FIG. 2 is a local register junctor.

Relay 10H is a reed relay (correed). It is energized by the originating marker applying ground potential to the HR lead. Contacts of this relay connect the tip and ring leads TO and RO to relay 10A, close a path to operate relay BY, which in turn has contacts to apply ground to the IT lead and via a path not shown lights a busy lamp. Contacts of relay 10H also supply ground potential to lead H to hold the originating connection. Relay 10H releases after the register-sender receives specific instructions from the data processing unit that the terminating marker has completed its functions which will cause the register junctor to eventually be released.

Relay BY is an HQA relay. This relay is normally operated by ground potential via contacts of the H relay, but can also be operated by a busy switch not shown. When this happens it makes the register junctor busy to the originating marker. Contacts of relay TR will also hold relay BY operated. Relay TR is operated during sequence states PSS=6 to PSS=15 which will be described in the operation of the common logic circuits. Since the relay 10H drops after sequence state PSS=12, relay TR will hold up the relay BY until memory is cleared. Relay BY is slow to release (25 milliseconds) because of a diode not shown across its coil. This makes it the last relay in the register junctor to release.

Relay 10A is a single reed relay with three windings, as disclosed in said BATTERY FEED RELAY patent. Two of the windings are connected magnetically in series aiding direction while the third is not actively used. Relay 10A is operated under the control of the subscriber loop (or trunk) via the tip and ring leads. After relay 10H has operated connecting the register junctor to the subscriber line, wih the telephone at the subscriber station off-hook closing the path between the T and R leads, relay 10A operates. Contacts of this relay supply ground to a contact test gate 1010, which generates a true signal on lead PHM (pulsing highway) which via the multiplex circuits is supplied to the register controller RRC (not shown).

During the reception of dialed digits relay 10A follows the dial pulses which are therefore repeated via lead PHM to the common logic circuits. Relay A is also used in conjunction with relay TST during a party or coin test, and operates if there is a ground on the tip lead at the subscriber station. When relay 10H releases during sequence state PSS=13, relay 10A is also released.

Relay BD1 is an HQA relay. It may be operated under two sets of circumstances. The first is to return dial tone to the subscriber during sequence state PSS=2 or PSS=3, and the second is to return busy tone to a subscriber line or trunk during sequence state PSS=11, at which time relay TR is operated. This relay is operated via a signal from the multiplex circuits on lead BD1M which operates the relay driver 1013.

Relay RD2 is an HQA relay. It is operated via a signal on lead RD2M operating relay driver 1014 under two sets of circumstances, one being to return distinctive dial tone to a subscriber, and the second being to return reorder tone if relay TR is also operated.

Relay 10CT is a reed relay. This relay is controlled by the TSC (test sequence counter) in memory. It is operated for 10 milliseconds while performing a coin test or party test. While it is operated it includes the TST relay in the test path from the relay 10A and source battery, to the ground provided for the subscriber equipment.

Relay PT shown in FIG. 10 as a single relay actually comprises two mercury wetted reed relays in parallel, operated by the same fast release relay switch 1007 under control of a signal on lead PTM. They are operated for 30 milliseconds for control of the path for coin and party tests.

Relay SP is a reed relay which is used to open parallel path during coin testing that is possible when testing for coin deposit from a single slot touch calling telephone. Without the path being open a "series" relay (or equivalent) in some (new single slot) coin telephones may not release, thus preventing coin ground from being applied to the tip side of the line. It is operated as a function of the CB bit of memory and TSC having started. It is operated for the same 30 milliseconds as PT during coin test.

Relay TST is a mercury wetted reed relay with three windings. This relay is used for coin deposited test and party two identification. When the test is not being made two of the windings are shorted out by contacts of relay 10CT. The third winding is constantly active giving a reverse-bias in the relay so that any contact switch bounce or stray potential will not operate relay TST giving a false indication.

Relay TR is a HQA relay which is activated during sequence states PSS=6 or greater via relay driver 1012. When operated this relay disables the path for dial tone and enables the busy and reorder tone paths, moves relay CT from the circuit and prepares a path for relay SD, removes relay SP from the circuit and prepares a path for lead C1 to the originating trunk circuit, maintains relay BY operated and opens a path from the sender-receiver pull battery switch 1006 via lead PXR to the matrix. This last set of contacts is a protection feature to insure that a multiple path is not pulled in the matrix should the main battery switch 1006 fail.

Relay SD is a mercury wetted reed relay. This relay (start dial) has two functions in the call process. First it recognizes that the terminating marker has seized the outgoing trunk or terminating junctor and it also receives start dialing commands from the distant office. Then the terminating marker seizes an "S" relay of the trunk or terminating junctor, relay SD is also operated.

Contacts of this relay operate a test gate 1011 to send a logic signal to the register-sender central control via lead TSDM. In response thereto a signal on lead CSTM operates relay driver 1005 to relay SD. When the terminating marker releases, relay SD drops, but the S relay of the terminating junctor or trunk is held by the ground from relay driver 1005. When a distant office signals with a start dial (or stop dial if sending is in progress) a ground is received on lead ST causing relay SD to operate. When the distant office causes the start/stop dial to cease, relay SD releases to supply a signal to the register-sender common logic.

Register-Sender Memory Layout

Figure 9:
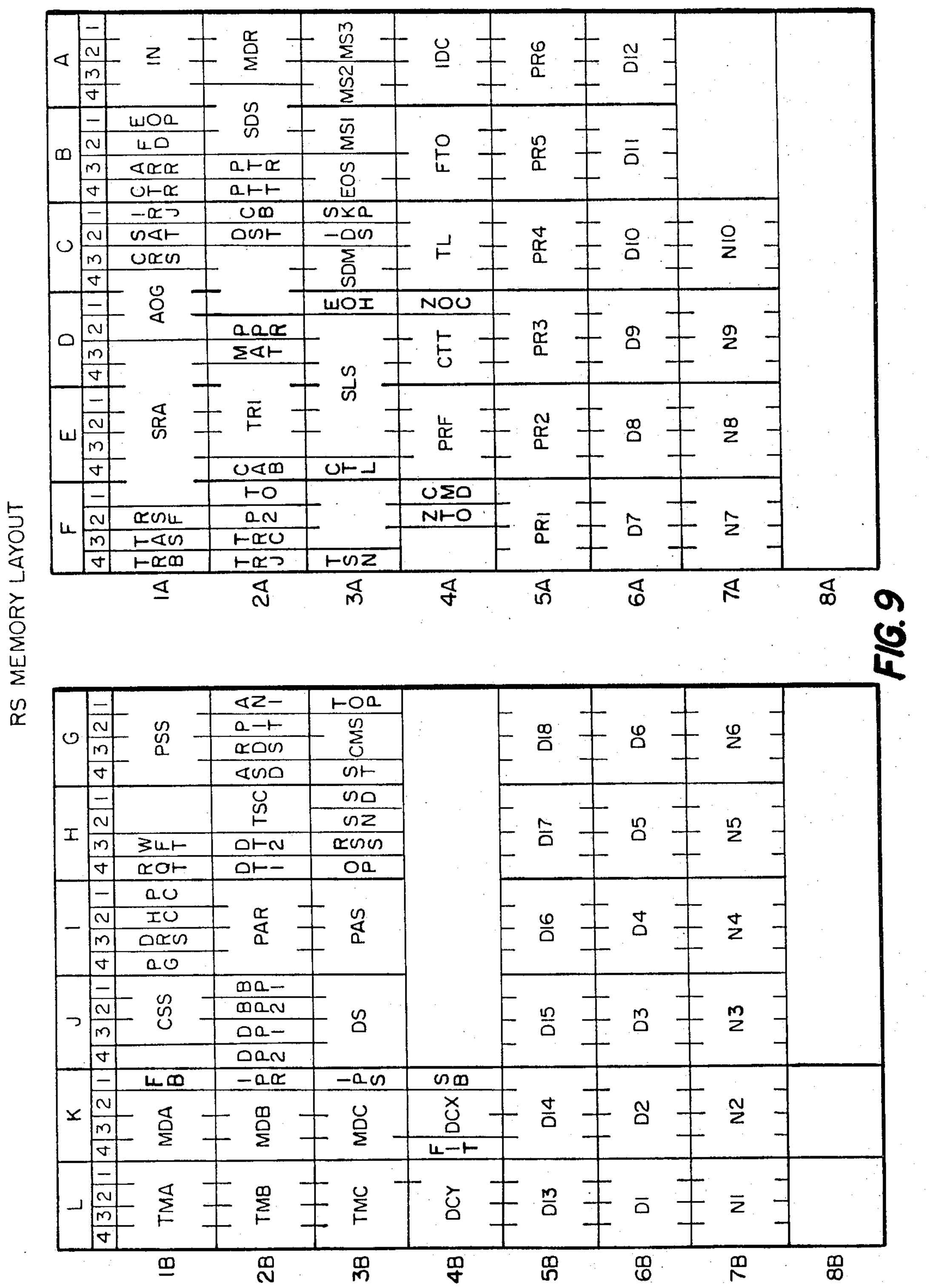

The layout of FIG. 9 designates the storage of information in the 16 word stores of a block assigned to one register junctor. For complete description of the information shown in FIG. 9, reference may be made to the SYSTEM patent application. In regard to the interlock arrangement of the present invention, the ST bit stored in bit position G4 of word or row 3B is utilized as hereinafter described in greater detail. The ST bit is an internal RS field used to control DC signaling on the terminating S lead (ST) through the selector matrix to the terminating junctor or outgoing trunk. Setting of the ST bit grounds the ST lead in the register junctor RRJ through the first winding of the SD relay thereof.

Terminating Marker

Referring now to FIGS. 4–8, there is shown the terminating marker 170, which is an electronic subsystem and functions to control the termination of a call. Referring to FIG. 1, on command from the data processor unit DPU (FIG. 3), the terminating marker terminates a call to a local line by selecting a terminating path through the selector matrix A, B, and C stages, a terminating junctor, and the line matrix C, B, and A stages (FIG. 3) to the called party. In the event the call is not terminating at a local line, but is to an outgoing trunk, the terminating marker controls the selection of a terminating path through the selector matrix A, B, and C stages to an outgoing trunk 116 (FIG. 1).

Terminating markers in the preferred embodiment are provided in pairs (TMA and TMB), but the terminating marker shown in FIG. 1 may be interpreted as either terminating marker A (TMA) or terminating marker B (TMB). A pair of terminating markers is designed to serve up to eight selector groups (or 10 when line groups are not served). Each selector group contains one selector matrix (A, B, and C stage) and associated connect and access circuitry. This same pair of terminating markers is also designed to serve up to ten line groups. Each line group includes one line matrix (A, B, C and R stages), originating junctors, terminating junctors, connect and access circuitry, and line equipment. One of the markers of a pair is selected for each terminating but the two markers do not operate simultaneously. In case of a marker fault, the alternate marker can handle the entire traffic load. When traffic warrants it, two pairs of terminating markers — two markers per pair — may be provided, if desired, to handle the traffic load by dividing the line and selector group matrices into separate sections.

The terminating marker also may be required to set up test calls on demand of the data processor unit DPU. In this case, the data processor unit instructs the marker as to the path to be set up and the manner, in which the call is to be processed.

As shown in FIG. 1, the terminating marker interfaces with the selector and line matrices through the access and connect circuitry associated with the selector and line matrices. The marker uses the access and connect circuitry to supervise and control the matrices when setting up a terminating path. The terminating marker interfaces with its companion (redundant) marker to provide clocked interlock control which prevents simultaneous connection of both markers to the same line or selector matrix. The terminating marker interfaces with the originating marker 160 to provide reserve bus and busy bus checks which guard against originating marker/terminating marker attempts to simultaneously access the same matrix.

The terminating marker interfaces with the data processor unit DPU via communication links, to provide for communication between these subsystems. Interface with the maintenance and control center provides for supervision of terminating marker operation and control of marker reconfiguration.

The terminating marker is divided functionally into six main circuit groupings, five of which consist of electronic logic circuits. The sixth circuit group is comprised of interface circuitry. In addition to these circuit groups, the terminating marker includes a test matrix. The circuit groups (FIG. 4) comprising the terminating marker are as follows:

a inlet control TIC (not shown),
b outlet control TOC,
c maintenance and supervisory TMS,
d sequence control TSC,
e communication transceiver TCT,
f interface TMI, and
g test matrix TTX (not shown).

The 3-letter mnemonic code for each circuit identifies the subsystem of which the circuit is a part (T for terminating marker) and circuit function; e.g. TIC, "terminating marker inlet control" and TMS, "terminating marker maintenance and supervisory."

The main functions of the inlet control circuit are to decode (binary to decimal) the selector and line matrix bytes received from the terminating marker's communication transceiver, and to mark the pull conductor on the inlet side of the network. The terminating marker's inlet control circuit does not provide a scanning function, except for private automatic branch exchange PABX or private branch exchange PBX calls, since selector matrix inlet identification is provided through direct communication with the data processor unit DPU. If the call is to terminate locally, the inlet control circuit checks to determine if the called line is busy.

Figure 4:
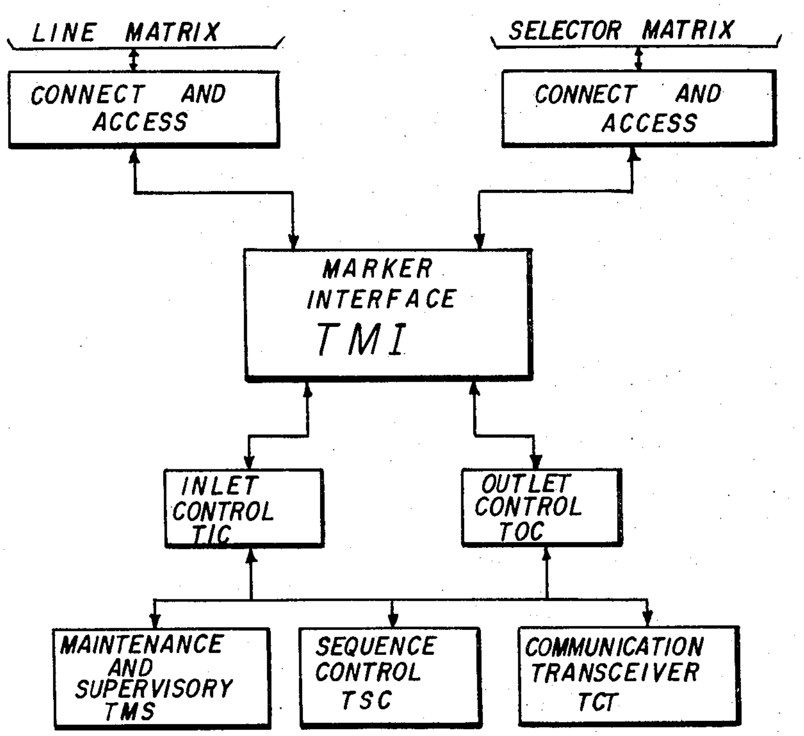
FIG. 4 is a block diagram of the terminating marker for the system of FIG. 1.

As shown in block form in FIG. 4, functionally the inlet control circuit in the terminating marker consists of logic circuitry to accomplish the following: decode and control line and selector matrix data; permit busy bus testing; provide interlock control of terminating markers; make a party busy test in the line matrix; call-for-service voltage enable; PABX or PBX scanning; and control seizure of terminating junctors.

The interlock control logic prevents both terminating markers TMA and TMB from operating simultaneously. This also serves as a double check of the data processor unit DPU since it is programmed to work the terminating markers on an alternate basis.

The call-for-service voltage control logic is used to facilitate certain tests performed on the switching network during path setup. This restriction previls until the terminating marker finishes with the call.

The PABX or PBX scanner logic is used to find a PABX or PBX inlet on a line matrix A-unit for a PABX or a PBX call terminating locally. The tens and units counters are used to store the A-unit inlet identity.

The selector matrix data decode and control logic is used to interpret selector matrix data upon its arrival from the data processor unit DPU in the shift register of the marker's communication transceiver. The data is required by the marker in order to select the proper path through the selector matrix.

The line matrix data decode and control logic is used to interpret line matrix data upon its arrival from the data processor unit in the shift register of the marker's communication transceiver. This data is required by the marker in order to select the proper path through the line matrix.

The busy bus check logic is used to determine if an originating marker is operating in the line matrix which the given terminating marker will now serve. If an originating marker is operating in the line matrix, the terminating marker marks the reserve bus of the line matrix, thereby preventing another originating marker from accessing the line matrix.

The party busy test circuitry tests the line matrix A-unit inlet of the called party for busy. If the called party is busy, the terminating marker so informs the data processor unit DPU via the communication transceiver. The data processor unit then causes the register-sender to return busy tone to the calling party.

The seize control logic is used to seize an idle terminating junctor. This junctor becomes part of the terminating path selected through the line and selector matrix by the terminating marker.

The outlet control circuit TOC functions to select a path through the selector matrix to an idle trunk (outgoing, CLR, etc.) or junctor if the call is not terminating at a local line. If the call is terminating at a local line, the outlet control circuit selects a path through the selector matrix to an idle terminating junctor and also selects a path through the line matrix between the called line and the same idle terminating junctor. In this way, the terminating transmission path is established through the selector matrix, terminating junctor, and line matrix on a call to a local line.

The outlet control is comprised of selector matrix decode circuitry, selector matrix path selection circuitry, line matrix path selection circuitry, pull control the test circuitry, and terminating junctor scanner with its associated equipment.

The selector matrix decode circuitry decodes selector matrix outlet data received from the data processor unit via the marker's communication transceiver. This data permits the outlet control circuit to locate the correct horizontal or horizontals and array or arrays within the selector matrix.

The selector matrix path selection circuitry provides for selector matrix AB-link and BC-link selection. AB-link control circuitry finds an idle link between an A-unit and a B-unit. BC-link control circuitry finds an idle link between the B-unit and the C-unit containing the outlet identified by the selector matrix decode circuitry described in the previous paragraph.

The line matrix path selection circuitry provides for line matrix AB-link and BC-ling selection. AB-link control circuitry finds an idle link between an A-unit (which contains the called parties inlet) and a B-unit. BC-link control circuitry finds an idle link between a B-unit and a C-unit.

The pull control and test circuitry is used for pulling the path through the line and selector matrix. In addition, it provides for testing this path for any malfunction.

The scanner and its associated equipment are used to locate an idle terminating junctor by scanning the idle test leads of the terminating junctors associated with the C-unit outlets of a selector matrix. Upon finding an idle terminating junctor, the outlet control circuitry connects the selector matrix to the line matrix through the terminating junctor. The tens counter is used to store the identity of the array and the units counter is used to store the identity of the C-unit.

Figure 5:
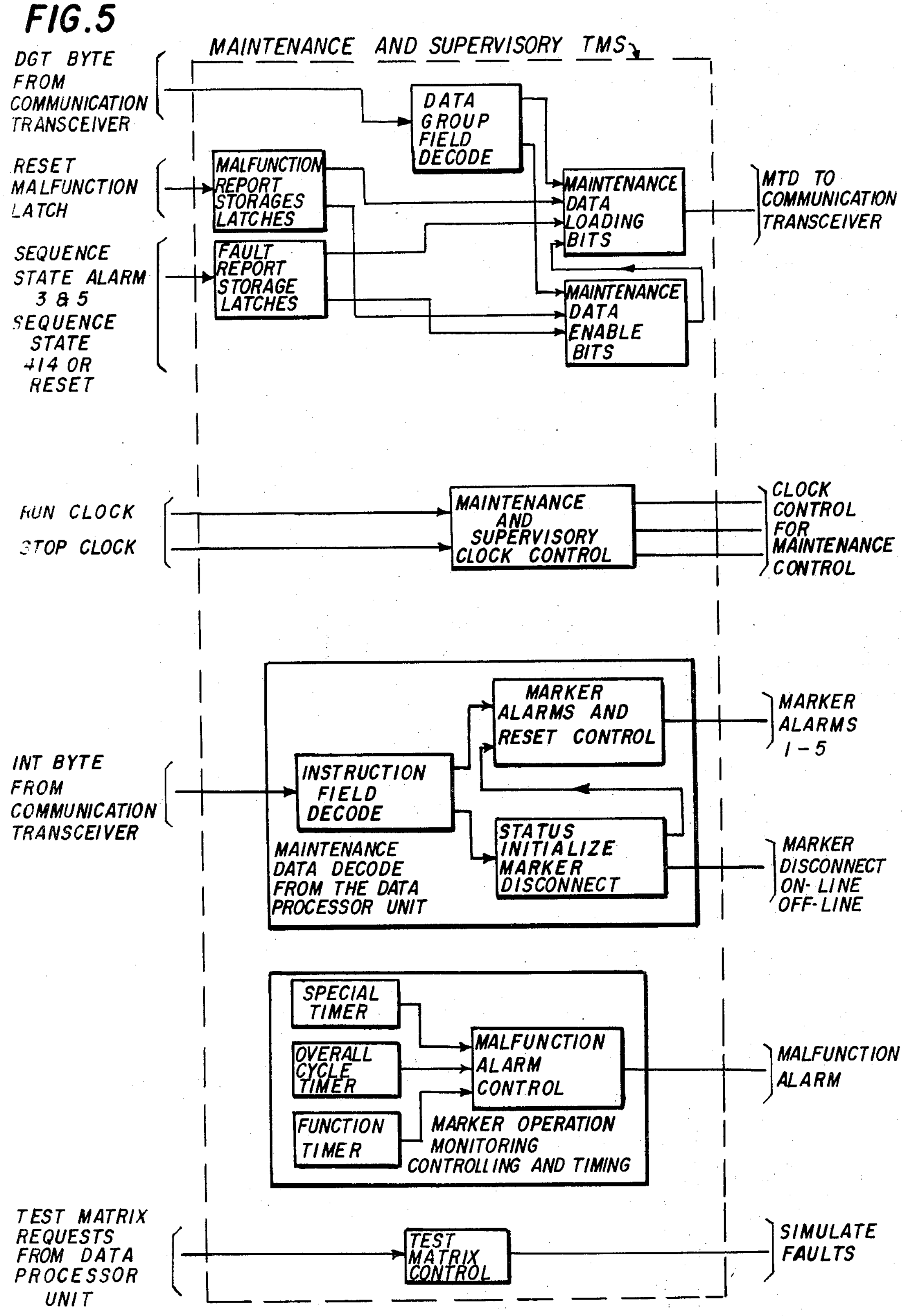
FIG. 5 is a block diagram of the maintenance and supervisory circuit of the terminating marker.

As shown in FIG. 5, the maintenance and supervisory circuit TMS monitors the operation of the terminating marker from the time a matrix assignment is made until the marker completes its cycle of operation. The maintenance and supervisory circuit monitors the operation of the terminating marker by means of alarms and timers. It also provides an interface to test and control equipment and has the ability to retrieve maintenance data. As shown in FIG. 5, the main functions of the maintenance and supervisory circuit are as follows: malfunction and fault report storage; data group field decoding and gating; terminating marker maintenance and supervisory clock control; decoding of maintenance data received from the data processor unit; marker operation monitoring, controlling and timing; and test matrix control.

The malfunction and fault report storage circuitry is used to store minor faults and malfunctions. These minor faults or malfunctions are reported to the data processor unit when the terminating marker has completed its cycle of operation.

The data group field decode logic enables the maintenance data stored in the malfunction and fault report storage latches to be sent to the data processor unit upon its request. The maintenance data loading circuitry and maintenance data enable circuitry send the information in the malfunction report storage and fault report storage to the data processor unit.

The terminating marker maintenance and supervisory clock control circuitry is used only during a maintenance call. If a minor fault or malfunction occurs while processing a call, fault or malfunction data is stored in the maintenance and supervisory circuit until the marker completes its cycle of operation. When the call processing cycle is completed, and upon request by the data processor unit, the maintenance and supervisory circuit sends the malfunction or fault data to the data processor unit, via the terminating marker communication transceiver, under control of the maintenance and supervisory clock control circuitry.

The instruction field decode logic circuitry is used to decode maintenance data instructions from the data processor unit. This instruction is a result of the malfunction or fault which was stored in the malfunction and fault report storage circuitry and sent to the data processor unit. The instruction field decode tells the marker in what condition to set itself.

The timing of the marker's operation is monitored and controlled by three clocks (not shown) and a malfunction alarm control circuit. The three circuits include an overall cycle timer for timing the entire call processing cycle performed by the terminating marker; a function for timing the length of time required by a sequence state and the maximum time allowed in a sequence; and a special timer used for special timing such as contact bounce. The malfunction alarm control reports a malfunction detected by one of the clocks.

The test matrix control circuitry receives data from the data processor unit and operates the test matrix according to the data received. A test call is set up in the test matrix as a result of a malfunction or fault that was reported to the data processor unit. One use of test calls is to verify the fact that the fault was not a momentary occurrence.

Figure 6:
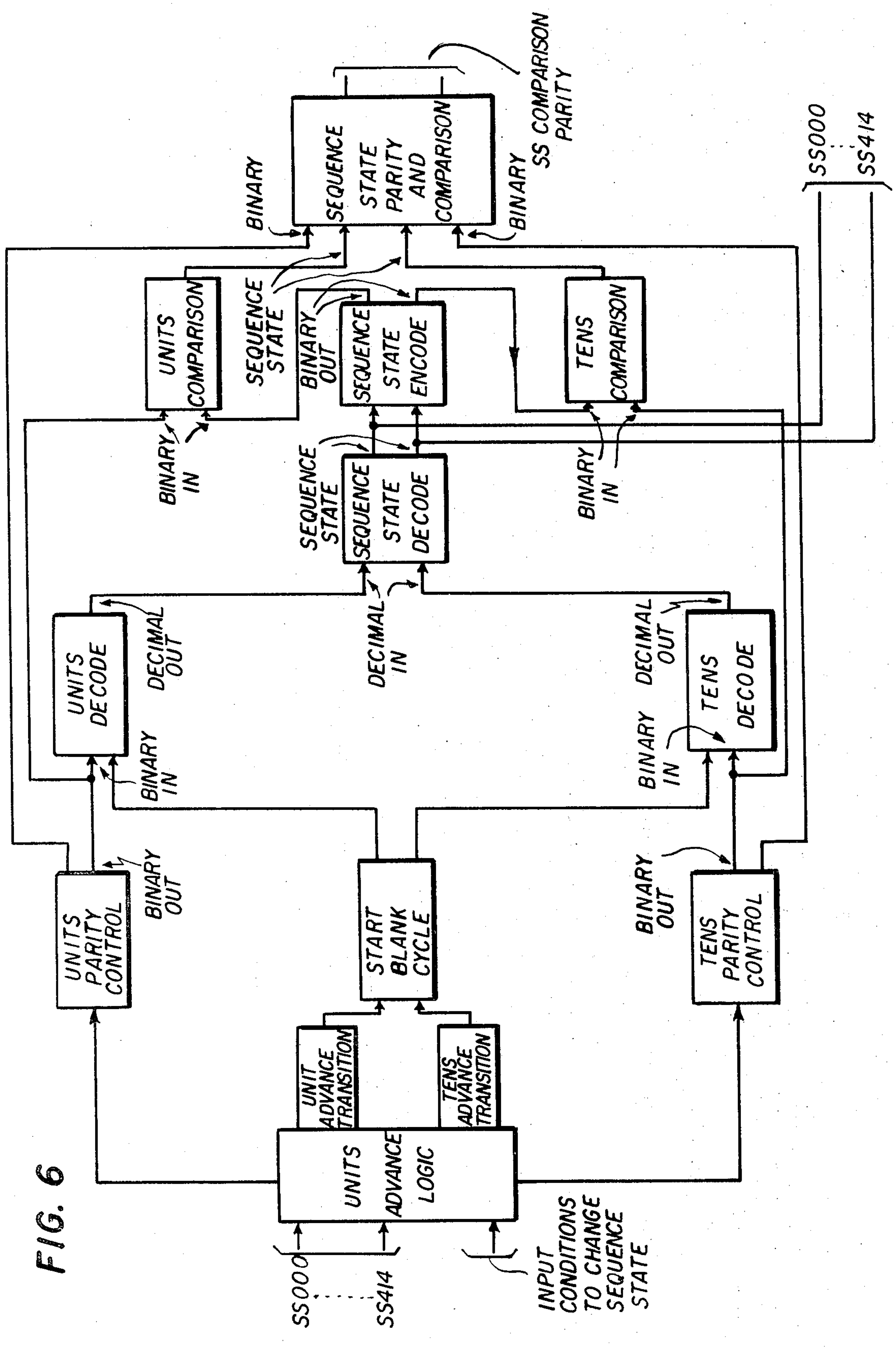
FIG. 6 is a block diagram of the sequence control circuit of the terminating marker.

As shown in FIG. 6, the terminating marker sequence control circuit TSC provides central control of all the processes performed by the marker. It also contains the clock pulse generating circuitry for the marker.

The main functions provided by the sequence control circuitry are as follows: units advance logic (units represent the units digit portion of the sequence state number - e.g., SS414); units and tens parity control (tens represent the tens digit portion of the sequence state number - e.g. SS414); units and tens decode; sequence state decode; sequence state encode; units and tens comparison; sequence state parity and comparison, units and tens advance translation; and start blank cycle. In addition, the sequence control circuit controls the reset timer, and starts the overall cycle timer in the marker's maintenance and supervisory circuits.

The units advance logic determines whether or not to advance its sequence state logic to the next sequence state. The sequence state is advanced if the terminating marker is in the condition which fulfills the requirements of the present sequence state and everything in the present sequence state has been completed correctly according to the conditions of the call.

The units and tens parity control logic of the sequence control circuit checks the binary results of the units advance logic when the units advance logic advances the sequence state.

The units and tens decode logic translates the binary coded sequence state from a binary number to a decimal number. This decimal number is sent to the sequence state decode circuitry.

The sequence state decode circuitry receives decimal numbers from the tens and units decode. It then converts this decimal number to a sequence state and sends the sequence state number to the sequence state encode logic circuitry.

The sequence state encode circuitry receives the sequence state from the sequence state decode circuitry. It then converts the sequence state number into a binary units digit and a binary tens digit.

The units comparison and tens comparison circuitry receives the binary units and binary tens data from the sequence state encode logic. The units and tens comparison circuitry then converts the binary number into a sequence state number.

The sequence state parity and comparison circuitry compares the binary tens and units (with parity) information received from the units and tens parity logic to the sequence state number received from the units and tens comparison logic. If the proper comparison and parity is generated by the sequence state parity and comparison circuitry from its input, the sequence state is advanced.

The units advance translation output from the units advance logic circuitry operates a start blank cycle. The start blank cycle consists of logic which keeps the marker under control via the units and tens decode circuitry while the sequence state advance is taking place.

The sequence control circuit also contains the oscillator and clock counters A, B, and C (not shown). The oscillator is the main clock control for all other clocks in the terminating marker. It drives clock counters A, B, and C. Clock counters A, B, and C provide the various clock pulses used by the marker's sequence control circuit.

Figure 7:
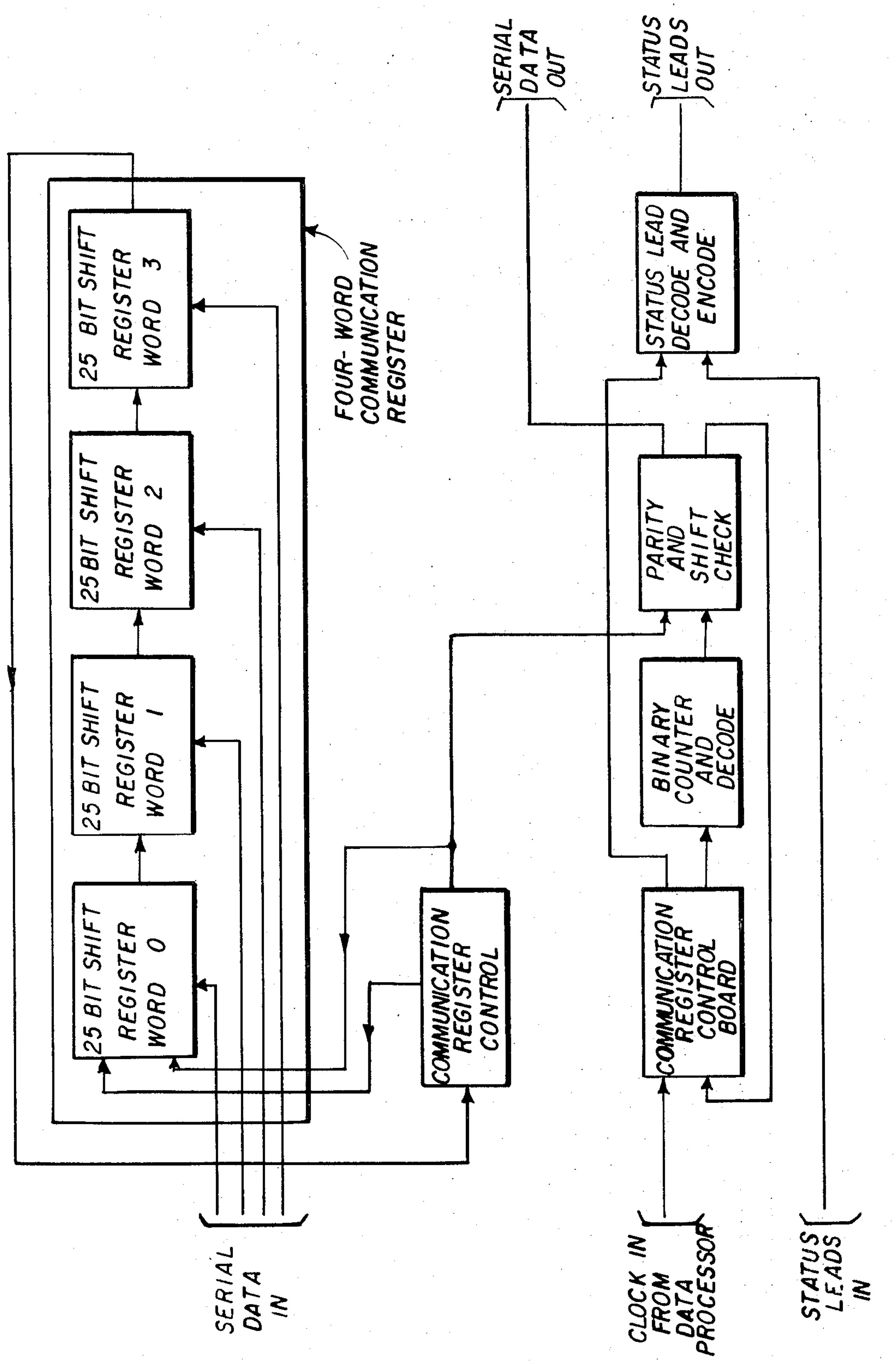
FIG. 7 is a block diagram of the communication transceiver circuit of the terminating marker.

Referring to FIG. 7, the communication transceiver TCT receives a call-for-service indication from the data processor unit. This call-for-service indication tells the communication transceiver that data from the data processor unit is about to be sent to the communication transceiver. This data consists of four data frames. These data frames provide the terminating marker with the identity of the selector group inlet to be serviced and the identity of the selector group outlets connected to the correct junctor or trunk circuit group. Also, this data includes any information that pertains to this call to be loaded into these junctors or trunk circuits. If the call is to a line group, the data also includes the line to which the call is to be terminated. At the end of the marker's call processing cycle, the terminating marker's communication transceiver returns a data frame to the data processor unit. This data frame contains the above information along with the exact junctor or trunk circuit chosen by the terminating marker to complete the connection.

The communication transceiver contains a four-word communication register, communication register control and control board, binary counter and decode logic, parity and shift check logic, and status lead decode and encode logic.

Figure 8:
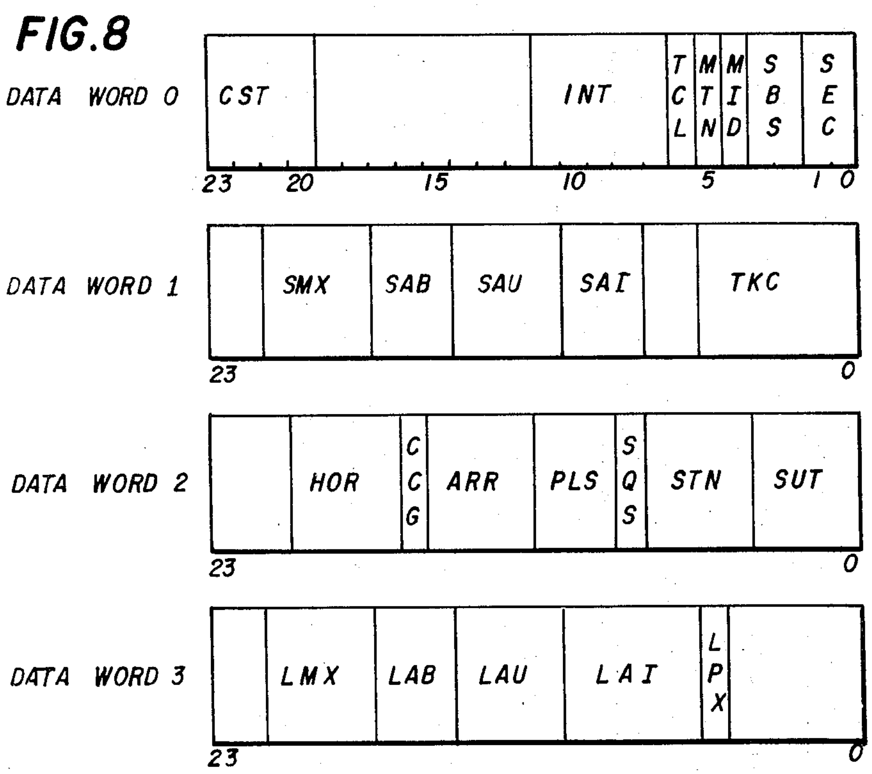
FIG. 8 is a chart showing the information transferred by the communication transceiver.

The four word communication shift register makes up the majority of the communication transceiver. This communication register consists of four 25-bit shift registers which convert incoming serial data into parallel data and convert parallel data into outgoing serial data. As shown in FIG. 8, there is presented the four data word frames. The communication code mnemonics related to these data frames are presented in the following table:

| TYPE OF CODE | CODE MNEMONIC | DEFINITION OF CODE MNEMONICS |
|---|---|---|
| General Information | SEC | Section |
| | SBS | Subsection |
| | MID | Marker Identity |
| | MTN | Maintenance |
| | TCL | Test Call |
| Call Processing Codes | INT | Instruction Terminating |
| | CST | Call Status Terminating |
| | TKC | Trunk Control |
| | SAI | Selector A Inlet |
| | SAU | Selector A Unit |
| | SAB | Selector AB Group |
| | SMX | Selector Matrix |
| | SUT | Selector Units |
| | STN | Selector Tens |
| | SQS | Sequential Scan |
| | PLS | Plus |
| | ARR | Array |
| | CCG | C Card Group |
| | HOR | Horizontal |
| | LPX | Line PBX |
| | LAI | Line A Inlet |
| | LAU | Line A Unit |
| | LAB | Line AB Group |
| | LMX | Line Matrix |

Word "0" contains the control data and marker identiy; word "1" contains selector group inlet identity and trunk control information; word "2" contains selector group outlet information; and word "3" contains terminating line identity information.

When the shift register is used to receive maintenance data from the data processor unit, word 0 contains data group terminating information, word 1 contains maintenance data terminating information, and word 2 is used to control the test matrix. FIG. 8 shows the maintenance data word frames used to receive maintenance calls from the data processor unit.

The communication register control and control board (see FIG. 7) are used to control the loading of the shift registers and for shift checking to insure that the correct data is being loaded into the shift registers. The communication register control and control board also determine whether a good or bad message has been received from the data processor unit.

The binary counter and decode circuitry counts the bits coming into the communication transceiver serially from the data processor unit.

The parity and shift check circuit receives and sends serial commands over status leads to the data processor unit and checks for correct data. Each 26-bit incoming serial data word is checked for correct (odd) parity, and correct parity is generated for each outgoing serial 26-bit data word.

Status lead decode and encode circuitry decodes incoming binary status information (e.g., bad message received, etc.) from the data processor unit and stores it in the appropriate logic circuitry of the communication transceiver. The status lead decode and encode circuitry also encodes status lead information that is stored in the logic circuitry in the communication transceiver and converts it into binary code to be sent to the data processor unit. The status leads are used to send to the data processor unit from the marker's communication transceiver the condition of the marker. If a malfunction or fault occurs in the marker, a trouble indication is sent via the sense lines to the data processor unit.

As previously stated, the terminating marker supervises and controls the operation of the selector and line matrix of the switching network in the process of terminating a call. In order to accomplish this function, marker interface circuits convert electronic logic signals to voltages capable of driving network correeds, relays, and lamps. Conversely, the operation of certain marker logic circuitry is controlled by signals derived from the operation of network correeds, relays, or other electromechanical components. Thus, the interface circuits in the terminating marker provide a means for compatible transfer of information between electronic logic circuitry in the marker and electromechanical circuitry in the network.

The group of interface circuits used in the marker constitute the interface between the functional logic circuits of the marker and electromechanical circuits of the network.

These frequently used interface circuits are the main-battery test (MBT) circuit, main-battery ground switch (MGS), and main-battery switch (MBS). The purpose of the main-battery test circuit is to detect the presence of main-battery or any voltage more negative than −8 volts. The main-battery ground switch is used to connect ground to a circuit that is connected to a negative voltage. The output of the main ground switch is connected to electromechanical equipment; the inputs are connected to electronic logic circuits. The main-battery switch is used to connect battery to a circuit that is connected to ground. The output of the main-battery switch is converted to electromechanical equipment; the inputs are connected to electronic logic circuits.

The test matrix TTX is a tool used to aid in marker testing. The test matrix does not process any customer traffic. All calls to the test matrix are identified as test calls sent from the data processor unit via the terminating marker's communication transceiver. Certain fault conditions can be simulated in the test matrix to verify that the checking hardware in the marker is operating properly. The test matrix can be used to routine or cycle the marker to localize a malfunction, without affecting customer traffic.

Within the text matrix for a terminating marker, there is a line test matrix and a selector test matrix. Each test matrix has an access circuit almost identical to a switching network matrix, but the connect and switching circuits are entirely different. A partially implemented connect circuit reacts much like a regular connect circuit, but instead of connecting to one of many inlets or outlets, always connects to the same point.

Certain fault conditions can be simulated in the test matrix. By simulating a fault and routining the marker, the operation of the marker checking hardware can be verified without affecting normal call processing. Fault simulation in the test matrix can be done under program control (routines to be performed frequently) or manually (infrequent routines and those which require measurement).

Terminating Marker Operation

This part briefly describes the functions performed by the terminating marker in processing a call for service. The purpose of this description is to provide a general understanding of what the terminating marker does when it receives a block of information from the data processor unit. This block of information, on a call to a local line or an outgoing trunk call, contains selector group inlet information associated with the calling party (such as selector matrix, selector AB group, selector A-unit, and selector A-unit inlet). Also, this block of information contains selector group outlet information associated with the local called party or outgoing destination (such as horizontal, C-card group, array, plus byte, and sequential scan). If the call is to terminate at a local line, the block of information will include the identity of the line matrix, line AB-group, line A-unit, and line A-unit inlet associated with the called party. If the call is to an outgoing trunk, the block of information will identify the selector outlet associated with the appropriate outgoing trunk. Acting on the block of information received from the data processor unit, the terminating marker completes a call to a local line by establishing a path through the selector matrix, an idle terminating junctor, and through the line matrix to the local line. Similarly, on an outgoing call, the terminating marker establishes a path through the selector matrix to an outgoing trunk circuit.

The terminating marker has to be in an idle state in order to receive a call-for-service from the data processor unit. The data processor unit determines which terminating marker is idle and able to service a call, then transmits a call for service to the chosen marker.

The data processor sends to the terminating marker, via the marker's communication transceiver, a block of information consisting of the instructions and data needed for the call to be established. The terminating marker decodes this block of information to determine whether the call is to an outgoing trunk or whether the call should be extended through a line group to a local line.

If the call is an outgoing call, the marker operates appropriate selector access circuitry to connect the marker to one of eight selector matrices in the selector group. After the access equipment has been operated, appropriate selector connect equipment is operated to connect the AB group, the A-card, the A-unit inlet, and the outlet group to the marker. Checks are made to assure there is a good connection between the terminating marker and the selector matrix. Once the terminating marker establishes a connection to the appropriate selector matrix through the connect and access circuitry, the terminating marker number selects a path through the selector matrix. The terminating marker will then perform multiple path checks on this path to insure a proper circuit after which the circuit is pulled and foreign potential checks are made. This completes a signaling and a talking path from the correct A-unit inlet to the correct C-unit outlet which is associated with the proper outgoing trunk circuit. The terminating marker sends path identity data to the data processor unit, then releases from the selector matrix, by restoring the connect and access circuitry. The terminating marker returns to idle and is ready to be assigned another call by the data processor unit.

If the call is to a local line, the marker tests the appropriate line matrix to determine if an originating marker has already accessed it. When the terminating marker determines that the line matrix is idle, it makes this line matrix busy to prevent one of the originating markers from accessing this line matrix. The terminating marker operates selector and line access equipment to gain access to the appropriate selector group and line group. A check is made to assure correct access. The terminating marker then operates line and selector connect equipment to connect itself to the line group (AB group, A-card, A-unit inlet, and terminating junctor group). The marker checks the access and connect circuitry to assure a correct connection. The line group AB links to the line group A-unit inlet are checked for busy. If the called line is busy and a connection cannot be made, the connect and access circuits paths established are dropped, and a data frame is sent to the data processor unit from the terminating marker. As a result, a busy signal is returned to the calling party.

If the A-unit inlet in the line group is idle, and the access and connect circuitry from the marker to both the line group and selector group is complete, a scan is made for an idle path through the line group and an idle path through the selector group to a common group of terminating junctors associated with the idle path. If the path selection through the line matrix is successful, and the path selection through the selector matrix is successful, the C-unit outlets associated with the selector matrix path are scanned. The scanning is performed in order to find an idle terminating junctor that is associated with the selected line matrix path. Once a path through the selector matrix, terminating junctor and line matrix is found, multiple path checks are made in the line and selector matrices to insure the path selected through the matrices is good. The circuit is pulled, foreign potential checks are made, and a talking path is established. Necessary data concerning the established path is sent to the data processor unit via the terminating marker's communication transceiver. The terminating marker disconnects from the line and selector matrices by releasing the associated connected and access equipment. The terminating marker returns to its idle state and is ready to process other calls.

In either type of call (trunk or local) the terminating marker releases the paths through the connect and access circuitry and tests for correct release of the connect and access equipment. Since the line matrix was made busy, (on a call to a local line) it is now made idle to other markers, originating and terminating. The terminating marker's communication transceiver sends the identity of the path selected to the data processor unit.

Trouble detection is accomplished through marker selfchecks, on a per-call basis, by internal checking circuits and the wired-logic sequence program of the terminating marker.

There are 5 alarms that are initiated by the terminating marker in the event of a marker malfunction:

a. ALARM 1. This is the most serious marker alarm. It forces the terminating marker off-line. This instruction also sets ALARM 2 to ALARM 5 instructions. This alarm is caused by a major malfunction of the terminating marker such as a clock failure.

b. ALARM 2. The terminating marker will process calls without performing any hardware checks (i.e., foreign potential, multiple path, comparison, parity, upcheck, downcheck, etc.) This instruction also sets ALARM 3 to ALARM 5 instructions.

c. ALARM 3. The terminating marker will process calls with major hardware checks being performed. No upchecks or downchecks are performed. This instruction also sets ALARM 4 and ALARM 5 instructions.

d. ALARM 4. The terminating marker will not perform downchecks of network, connect and access. This instruction also sets ALARM 5 instructions.

e. This is the least serious marker alarm. The marker will not perform link tests and other minor checks.

Any status information from the matrix necessary for maintenance is stored in the maintenance and supervisory circuit prior to disconnect. This marker, and the redundant marker of the path will be requested by the DPU to attempt the same connection which has just failed.

When a terminating marker goes into trouble, logic functions stop so that when tested, the logic levels are the same as when trouble was detected. After a trouble has been detected, the marker goes into a malfunction state, communicates the condition to the data processor unit, and enters a malfunction alarm. All call data and marker sequence state information is retrieved by the data processor unit by the use of the INITIALIZE command. Based on the call data and sequence state information, the data processor determines if a fault-error separation test call should be attempted.

The data processor unit makes a fault-error separation test (not repeatable), by instructing the failing marker to repeat the same connection. As a result, it may classify the malfunction as an error. In this case, the marker will be reset and placed back on-line. If the data processor unit classifies the malfunction as a fault (same failure occurs), it may instruct the redundant marker of the pair to set up a test call to simulate the exact call that failed. If the test call is unsuccessful, the malfunction is classified as not a marker problem and the marker is placed back on-line. If the test call is successful, the malfunction is classified as a marker fault, and the marker is placed in the off-line condition. Maintenance data is then retrieved (by the data processor unit) to isolate the fault.

A test call can be used to test the reproducibility of a malfunction by simulating a call that has just failed. Test calls also can be used to stimulate the marker to process a call in much the same way as a normal call. In this way, the marker's ability to process a call can be checked quickly and easily. By varying the type and route of the call, different circuits are exercised and the majority of call circuits in the marker and network can be tested.

There are four types of test calls that may be initiated by the data processor unit; these are:

a. TCT test. No call processing is performed, but the terminating marker's communication transceiver will return the data frame exactly as received.

b. TEST CALL A (no pull). This is a special call in which the inlet potential is not checked and the path is not pulled, but a multiple path check is made. This call is used only as a test call and the test call bit in the terminating marker's communication transceiver must always be set.

c. WIRE CHIEF. The path is completed even if the line tests busy. A line circuit test is performed on the established talking path. In addition, the call is completed to the called party even with the detection of faulty foreign potential conditions.

d. TEST CALL B. (line routine) This special call performs a line circuit test but does not override line busy or override any other check or test call.

Interlock Arrangement Operation

Considering now a typical operation of the interlock arrangement of the present invention, during the originating portion of a call, an originating path is established from a calling line through a line circuit, such as the line circuit LC1, the line group matrix A, the line group matrix B, an originating junctor 113, and the R matrix to an idle register junctor, such as the register junctor RRJ-0, under the control of the originating marker 160 which operates selected ones of the relays of the switching matrices and thereafter seizes the register junctor. The register junctor RRJ-0 then holds the originating path established by applying a ground potential to the lead H for holding the selected relay of the R matrix operated in series with the relay 9H of the originating junctor 113, the relay 9H in turn operating to apply a ground potential through a resistance and an inductor to the selected relays of the line group matrices to hold the path established. Thereafter, a dial tone is returned to the calling line via the transmission path T0 and R0 of the originating path so that the calling line may then transmit the dial pulses to the register junctor for storage in the register sender group.

After thus completing the originating portion of the call, the terminating marker 170 extends the originating path by means of a terminating path through the selector group matrices to the trunk circuit 116 by applying a ground potential through a connect and access circuit to the lead 174 and then to the selected relay coils of the selector group matrices and connects a negative battery potential through the connect and access circuit to a lead 175 at the other side of the series-connected selector group matric relay coils for operating or pulling them in series. As a result, the path comprising the transmission leads TT and RT and the control lead ST through the selector group matrix A, the selector group matrix B and the selector group matrix C is established from the register junctor RRJ-0 via the R matrix and the originating junctor 113 to the trunk circuit 116. The foregoing pulling operation is accomplished during the sequence state 210 of the sequence state control circuit of FIG. 6. Thereafter, the sequence control circuit TSC is advanced through its subsequent sequence states, and during its sequence state 300, the main ground switch 131 connects ground through the connect and access circuit of the terminating marker 170 to the control lead ST for operating both the relay S (FIG. 1) of the trunk circuit 116 and the relay SD (FIG. 2) of the register junctor RRJ-0. As a result, the relay S and the relay SD operate in parallel, the windings of the relay SD being connected in series. The relay SD then closes its contacts to energize the gate 1011 to signal the register-sender group that a path has been established between the register junctor RRJ-0 and the terminating marker 170. The test gate 1011 supplies a signal on a lead TSDM, which via the multiplex circuits, (not shown) supplies a signal RJM-TSD. As shown in FIG. 10 and also as shown in the flow chart of FIG. 11, the signal RJM-TSD enables an AND gate 210 of the RSC controller of the common control logic. The gate 210 is enabled by the coincidence of the signal RJM-TSD and the signal RCB-PSSC=6 together with the signal generated by an OR gate 212 which is enabled by either signal RCB-INC=3 or signal RCB-INC=4. The gate 210 when enabled causes an OR gate 214 to be enabled, whereby the gate 214 in turn enables an AND gate 216 during the sub-time slot Y3. The gate 216 generates the signal ROW3-G4 which is a signal for causing the bit ST to be written into the memory as shown in FIG. 9. The signal RCB-TSSC=6 is generated by the carry buffer (not shown) and indicates a certain state of the PSS field which is stored in bit positions G1, G2, G3 and G4 of row 1B (FIG. 9), and which is an internal register-sender counter field used by the register-sender group to control the functions of call processing. The sequence state PSS=6 indicates the interworking with the terminating marker during the terminating portion of the call. The signals RCB-INC=3 and RCB-INC=4 are generated by the carry buffer, and are part of a four bit IN field stored in bit positions A1, A2, A3 and A4 of row 1A of the memory (FIG. 9). The IN field is an instruction field used by the data processor unit to instruct the register-sender group to perform a certain function. The instruction IN-3 indicates that the data processor unit is working with the terminating marker — first and intermediate paths, this instruction indicating to the register-sender group that the data processor unit has seized an idle communication register and terminating marker and is about to transmit the terminating frame (this instruction is given on all uses of the terminating marker except the last). The instruction IN=4 indicates that the data processor unit is working with the terminating marker during the final path, and therefore this instruction is the same as the instruction IN=3 except that it indicates the last request for the terminating marker. For a complete understanding of all of the equations relating to the generation of the signal ROW3-G4, reference may be made to the SYSTEM patent application.

Whenever the signal RJM-TSD is true during sub-time slot Y3 the condition SD is written into bit H1 of row 3B (FIG. 9), as shown by RSC equation row 3 H1 in the SYSTEM patent application. Thus the signal condition SD appears in the register read buffer (not shown) as an output of latch H1 (not shown) one cycle after the condition TSD is detected from the multiplex circuits, so that in effect SD represents the "last look" from the preceding cycle of the condition TSD.

Writing ST causes the carry buffer latch CST (FIG. 10) to be set during sub-time slot Y11, and the AND gate 218 and the OR gate 221 are enabled in response to the signal RRB-ST which is the output of a read buffer latch ST (not shown), which in turn is set by the writing of the bit ST into the memory. The signal RTG-RCB-SET is a signal from the register timing generator and is common to most of the carry buffer latches. The carry buffer latch CST is also reset by a common signal RTG-RCB-RESET from the register timing generator. The setting of the latch CST causes via the multiplex circuits a signal to be supplied on lead CSTM (FIG. 2), and in the register junctor RRJ-0 a ground potential from the relay driver 1005 is supplied via the make contacts of the relay TR to the windings of the relay SD. Thus, the ground potential via the relay driver 1005 is also connected through the lower winding of the relay SD to the lead ST, which in turn is connected through the selector group matrices to the relay S of the trunk circuit 116 for holding it operated.

During a sequence state 308 of the sequence control circuit TSC of the terminating marker 170, a time delay of 14 milliseconds having occurred from the time of the sequence state 300 to the state 308 to permit sufficient time for the above-mentioned register junctor operations to take place, the main ground switch 171 of the terminating marker 170 is de-energized to remove the ground potential from the lead ST. As a result, there are opposing currents flowing in relay SD of the register junctor and it releases, since the direction of current flowing through the lower winding of the relay SD reverses. With the contacts of the relay SD released, the signal RJM-TSD becomes false.

If the data processor unit DPU indicates that the terminating marker is accomplishing the final stages (IN=4) the terminating loop is closed by operating the relay OP in the register junctor (FIG. 2). This is accomplished with RSC equation 11 disclosed in the SYSTEM patent application to write OP in bit H4 of word 3B of the memory during sub-time slot Y3, which during sub-time slot Y11 causes the carry buffer latch OPC (not shown) to be set. RSC equation 9 disclosed in the SYSTEM patent application now becomes true to set the carry buffer latches NPSS=7 so as to advance to sequence state PSS=7. Since this is an outgoing call, the signal RRB-EOS=0 is false and thus the rewriting of the bit ST into the memory is inhibited. In this regard, as shown in FIG. 10, an AND gate 223 enables the gate 214 for rewriting the ST bit into the memory, since the gate 223 is enabled by the output of the read buffer latch which generates the signal RRB-G4. However, in the present outgoing call the gate 223 is inhibited by an AND gate 225, which is enabled during sub-time slot Y3 by an AND gate 227 via an OR gate 229, since the signal RRB-EOS=0 is false. The gate 227 is enabled also by the AND gate 232 which is enabled by the following command: (RCB-PSSC=6) $\overline{\text{(RJM-TSD)}}$ (RCB-INC=6) (RRB-SD).

As noted above, whenever PSS=6, or greater, the transfer relay TR of the register junctor is operated in response to setting the carry buffer latch TR (not shown), which disconnects dial tones, and allows the return of busy or reorder tones if necessary.

During the next sequence state 309 of the sequence control circuit TSC of the terminating marker, the main battery test gate of the terminating marker 170 detects an intermediate voltage potential (between ground and the negative battery supply potential) on the lead ST between the originating marker 113 and the selector group matrix A for indicating that a path has been successfully established between the register junctor RRJ-0 and the selector group matrices and also that a path has been successfully established between the selector group matrices and the trunk circuit 116. As a result, the sequence control circuit TSC is advanced to its subsequent sequence state and the terminating marker 170 may proceed into its release sequence.

When the relay S of the trunk circuit 116 operates, it connects a ground potential to the time delay circuit TD, which in turn causes the relay CN to operate, whereby it connects the transmission leads T0 and RO to the battery feed relay BFO and connects ground potential to the hold lead H0 for maintaining the selected relays of the selector group matrices operated. The time delay circuit TD is an electronic circuit, such as the one disclosed in the DELAY CIRCUIT patent application.

The main ground switch 1005 of the register junctor RRJ-0 may interrupt the holding ground connected through the lower winding of the relay SD to the lead ST for signaling purposes, whereby the relay S of the trunk circuit 116 opens and then closes its contacts. TD and relay BFO, controlled during such signaling by relay OP in RRJ-0 (FIG. 2), insures that the holding relay CN does not release the transmission path. An example of signaling which may be incorporated into the trunk circuit 116, is E and M signaling, which includes a lead E and a lead M for that purpose. A signal on lead E energizes a relay TS via a normally-closed contact of the S relay, and when the relay TS operates, it closes its normally open contacts to apply ground to lead SO for signaling purposes. For outgoing signaling on the lead M, the relay S controls the operation of a battery feed slave relay BFS via its transfer contacts, and the relay BFS in turn causes signals to be supplied to the lead M, the signals either being a ground potential signal or a battery potential signal produced by an electronic current limiter or, in certain cases, a current limiting filament lamp.

In order to consider other examples of signaling by means of the ST lead, an operation within the register-sender group starting with the sequence state TSS=7 (a waiting state) may be considered. The register sender has already determined that the terminating marker has completed its portion of the operation, but the register-sender needs confirmation from the data processing unit. This is received in the form of IN=10. The flow chart 29-2 and RSC equations 44 and 45 shown and described in the SYSTEM patent application show that if sending is required ($\overline{EOS=0}$) then proceed to state PSS=8, and otherwise proceed to PSS=12 by setting the carry buffer latches NPSS. The operation is also timed as in state PSS=6. With an instruction of IN=3 or IN=4 the data processing unit is given 1.5 seconds, and with some other instruction (usually IN=0 or 15) 5 seconds are allowed, as shown by RPC equation 36 of the SYSTEM patent application.

Special instructions (IN=5 through IN=9 and IN=11) permit a jump of sequence states from any sequence state less than PSS=10 to PSS=10 or 12. The setting of the carry buffer NPSS latches and restarting of timer A is covered by RPC equations 41 and 42 of the SYSTEM patent application. The inhibiting of OP and ST for the purpose of dropping the terminating path is shown in RSC equations ROW3-G4 and ROW3-H4 of the SYSTEM patent application.

Sequence state PSS=8, is the state in which the trunk circuit is checked for a start dial signal. This signal is received (if applicable) via ground on the ST lead in the register junctor (from the TS relay in the trunk circuit). The data processing unit specifies what signaling is required on the trunk from the terminating class of service COS and supplies the indication via the SDM field (start dial mode, bits C3 and C4 of row 3A). The register-sender is then able to act upon that information.

An indication of SDM-1, wink start, is specified as an off-hook condition of at least 140 milliseconds, but the register-sender is able to detect it if it is at least 40 milliseconds. Normally the trunk circuit, after seizure, is in a state designated as "on-hook" which is repeated to the register junctor as absence of potential on the ST lead so that the SD relay is not operated. Therefore the signal RJM-TSD is not true and likewise the condition SD read from memory bit H1 of row 3B is not true.

In this condition the trunk circuit is timed, and is allowed five to 40 seconds to provide the wink start signal depending upon the switches and traffic.

When the distant office goes "off-hook," this is repeated as ground potential on the ST lead to operate the SD relay in the register junctor making the signal RJM-TSD true. At this time the condition SD (corresponding to the condition of TSD in the previous cycle) is still false. Therefore RSC equation 7 of the SYSTEM patent application becomes true to write ST and restart a timer C.

As long as TDS is true the condition SD is written and appears in the register read buffer in the next cycle.

With signal TSD still true (distance office remaining off-hook) and SD true the RMN unit is checked for a disabled time out condition DIS and allowed five seconds as shown in RSC equation 39 (SYSTEM patent application) which causes writing of condition TSN if there is trouble in sending. With wink signaling there should be only a lapse of 200 milliseconds maximum before the distant office goes on-hook again, which makes the signal condition TSD false. With SD still true from the previous cycle, if the off-hook was at least 40 milliseconds the condition RSS (received start dial signal, in bit H3 of word 3B) is written in accordance with RSC equation 8 (SYSTEM patent application), which also starts timer C. The condition C greater than or equal to 40 milliseconds is shown in RSC equation ROW3-H3, by specifying conditions in the L and K fields of row 3.

On the scan in the next cycle the condition SD will be false. After a delay of 150 milliseconds to permit the electromechanical equipment to settle down, the sequence state is advanced to PSS=9 by setting the NPSS latches in the carry buffer accordingly in accordance with RSC equation 6 (SYSTEM patent application) which also starts timer C and inhibits the writing of condition IPS.

With condition SDM=2, stop and start, the distant office has 300 milliseconds to begin signaling.

When the distance office goes off-hook and TSD therefore becomes true, RSC equation 7 of the SYSTEM patent application is enabled for writing SD and starting timer C.

With SD and TSD true the RS timing controls in the MCC unit determine timing in accordance with RSC equation 39 (SYSTEM patent application), the timing being up to 40 seconds.

When the distant office goes on-hook, provided it was off-hook more than 40 milliseconds, RSC equation 8 (SYSTEM patent application) provides for writing condition RSS and starting the timer C.

After 150 milliseconds the sequence proceeds to PSS=9 by setting the carry buffer latches NPSS in accordance with RSC equation 6 (SYSTEM patent application), which also inhibits the wriiting of IPS and starts the timer C.

With the condition SDM=0, there is a wait of 300 milliseconds, then proceed to sequence state PSS=9 in accordance with RSC equation 6 (SYSTEM patent application). This is the condition for sending to a step-by-step office which does not return any start dial signaling.

During sequence state PSS=9 the digits are sent out on the trunk, whether they be multifrequency or dial pulse or a combination.

When sending on a stop & go trunk (SDM=0), at any time during an interdigital pause (IPS) stop dial may occur, which operates the SD relay in the register junctor, giving the TSD signal which writes the condition SD so that it appears in the next cycle. After 40 milliseconds of this condition as indicated by timer C, RSC equation 32 is enabled for writing ST and setting the carry buffer NPSS latches to NPSS=8, to thereby return to sequence state PSS=8. At the end of the stop dial when RJM-TSD becomes false with SD still true, RSC equation 8 (SYSTEM patent application) is enabled for writing RSS and starting timer C. RSC equation 6 of the SYSTEM patent application also becomes true to inhibit the writing of IPS, to start the timer C, and to set the carry buffer latches for NPSS=9 to return to sequence state PSS=9.

During every interdigital pause (IPS), after 20 milliseconds indicated on timer C on a stop & go trunk, condition ST is cleared to accommodate possible reception of a stop dial signal covered by RSC equation 31 (SYSTEM patent application).

What is claimed is:

1. An interlock arrangement for a communication switching system having a switching network for interconnecting calling and called lines and having marker means for controlling the switching network to establish a path therethrough including holding control means between a first supervisory unit and a second supervisory unit, said interlock arrangement comprising:

marker switching means in said marker means for applying a first holding signal to said holding control means for causing said path to be maintained between the first supervisory unit and the second supervisory unit and for removing subsequently said first holding signal from said holding control means;

supervisory switching means in the first supervisory unit responsive to said first holding signal to apply a second holding signal to said holding control means for maintaining said path established before said marker switch means removes said first holding signal from said holding control means; and testing means in said marker means responsive to the removal of said first holding signal and to the presence of said second holding signal for causing said marker means to release, whereby the first supervisory unit maintains the path established.

2. An interlock arrangement according to claim 1, wherein said second supervisory unit includes a holding device coupled to said holding means, said holding device being responsive to said first signal or to said second signal to maintain said path established, a connecting device responsive to said holding device for coupling said path to said second junctor.

3. An interlock arrangement according to claim 2, wherein said first supervisory unit includes means for interrupting said second signal for a given period of time, time delay means responsive to said holding device for energizing said connecting device after a predetermined time interval, said predetermined interval being substantially longer than said given period, so that said connecting device remains energized during said given period.

4. An interlock arrangement according to claim 3, wherein said supervisory switching means includes a supervisory relay having first and second windings connected in series and coupled to said holding control means.

5. An interlock arrangement according to claim 4, wherein said holding device includes a holding relay coupled to said holding control means and adapted to operate simultaneously with said supervisory relay, said first holding signal being coupled to said holding control means between said supervisory relay and said holding relay.

6. An interlock arrangement according to claim 5, wherein said second holding signal is coupled to said holding control means between the connections of said supervisory relay and said holding relay to said holding control means, said testing means being responsive to the removal of said first holding signal and to the presence of said second holding signal by detecting an intermediate potential signal.

7. An interlock arrangement according to claim 6, wherein said supervisory relay operates in response to said first holding signal with said first and second windings energized in series, said second holding signal being coupled through said first winding to said holding control means, said first and second windings remaining energized to maintain said supervisory relay operated, the direction of current flow through said first winding being reversed when said first holding signal is removed to cause said supervisory relay to restore due to opposing fields therein.

8. An interlock arrangement according to claim 7, wherein said marker switching means removes said first holding signal after a predetermined time interval.

9. An interlock arrangement according to claim 8, wherein said marker means includes a sequence counter adapter to advance sequentially at given fixed intervals of time, said predetermined timing interval being determined by a number of said given fixed intervals.

10. An interlock arrangement according to claim 9, wherein said first supervisory unit is a register junctor.

11. An interlock arrangement according to claim 10, wherein said second supervisory unit is a trunk circuit.

12. An interlock arrangement according to claim 10, wherein said second supervisory unit is a terminating junctor.

13. An interlock arrangement according to claim 1, wherein said marker switching means removes said first holding signal after a predetermined time interval.

14. An interlock arrangement according to claim 13, wherein said marker means includes a sequence counter adapted to advance sequentially at given fixed intervals of time, said predetermined timing interval being determined by a number of said given fixed intervals.

15. An interlock arrangement according to claim 1, further including a common logic unit associated with said first supervisory unit, said logic unit having memory means, said logic unit having logic means for storing an ST bit of information in said memory means, said supervisory switching means including means responsive to said first holding signal for causing said logic means to store said ST bit in said memory means.

16. An interlock arrangement according to claim 15, wherein said supervisory switching means further including signal generating means for generating said second holding signal, said logic unit further including carry buffer means responsive to said ST bit being stored in said memory means for causing said signal generating means to generate said second holding signal.

* * * * *